Feb. 10, 1931. A. W. L. SCHERMULY ET AL 1,792,399
COLLAPSIBLE TRIPOD AND LIKE STAND
Filed April 3, 1928   2 Sheets-Sheet 2
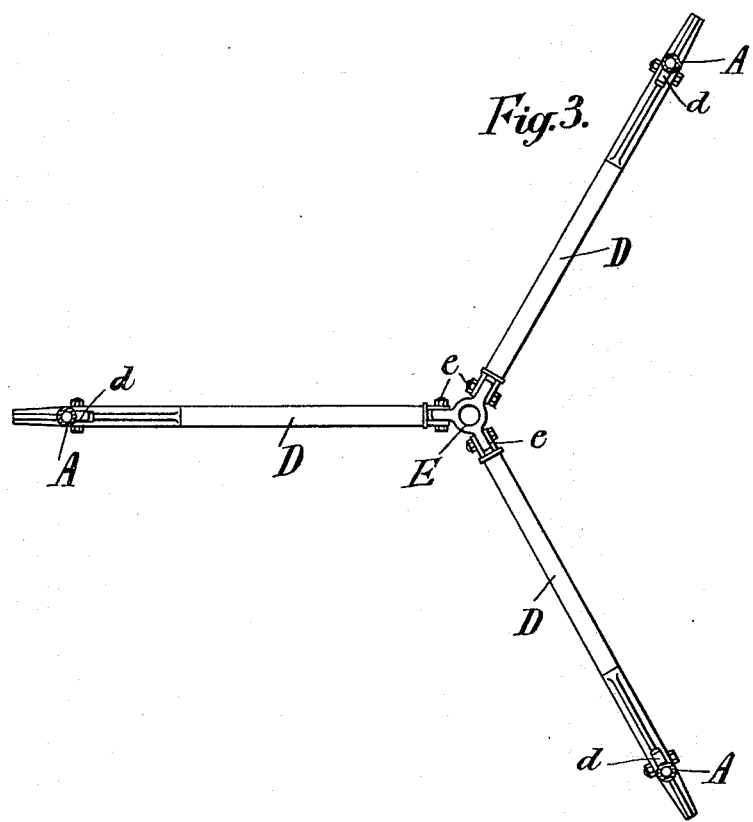
INVENTORS
AUGUSTUS WILLIAM LOUIS SCHERMULY
ALFRED JAMES SCHERMULY
CHARLES SCHERMULY
BY THEIR ATTORNEYS
Howson and Howson Patented Feb. 10, 1931

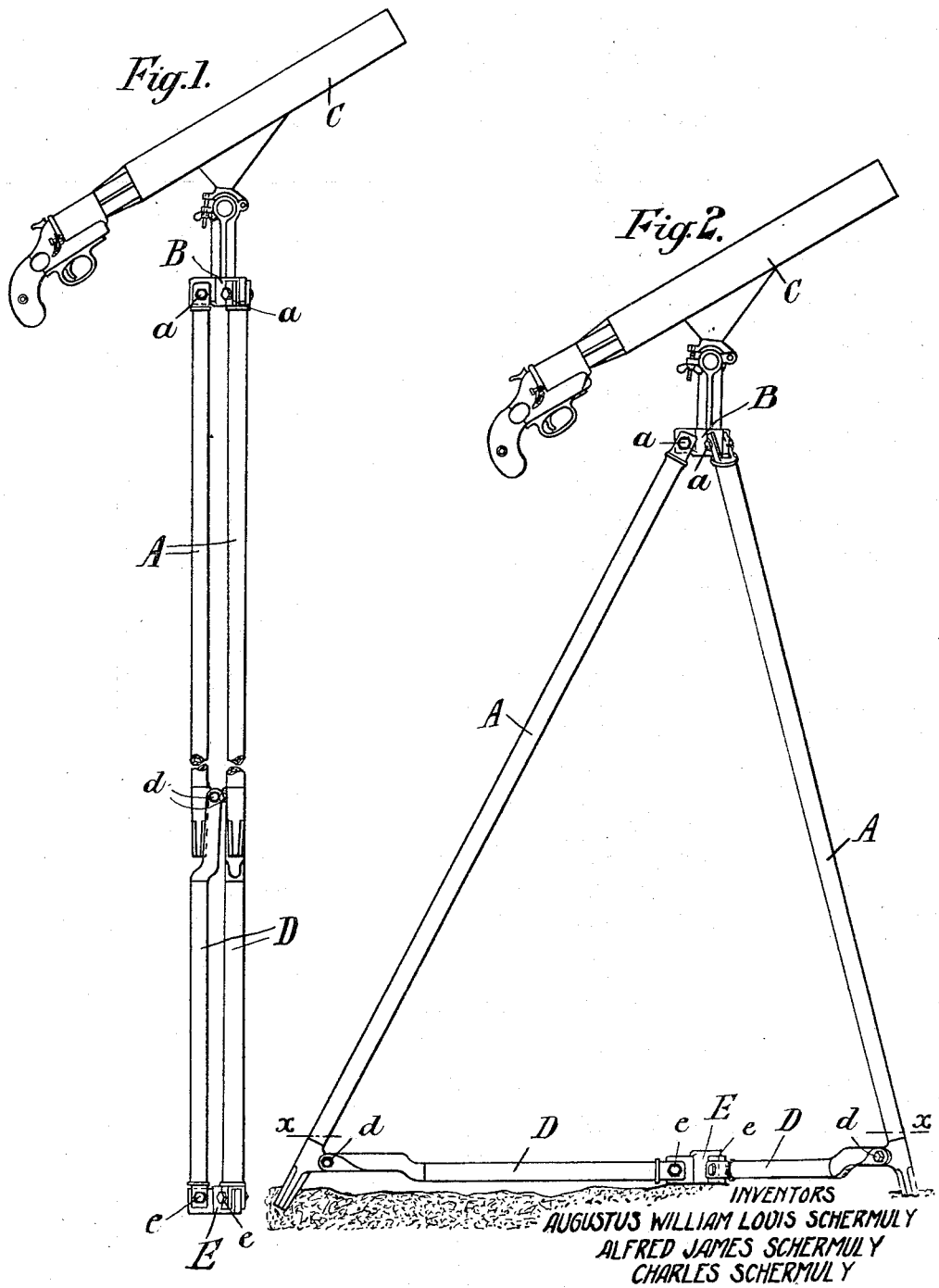

1,792,399

UNITED STATES PATENT OFFICE

AUGUSTUS WILLIAM LOUIS SCHERMULY, ALFRED JAMES SCHERMULY, AND CHARLES SCHERMULY, OF SUTTON, ENGLAND

COLLAPSIBLE TRIPOD AND LIKE STAND

Application filed April 3, 1928, Serial No. 267,102, and in Great Britain April 28, 1927.

This invention relates to collapsible tripods and like stands (hereinafter referred to as tripods) of the kind in which movement of the legs relatively to one another when the tripod is erected for use is prevented by tie-rods having one of their ends pivotally connected to the said legs and their other ends interconnected. In tripods of the aforesaid kind it has been proposed to pivotally connect the upper end of the respective legs to the lower part of a stem carrying a head, table, or the equivalent, and to pivotally connect one end of the tie-rods to the said legs and the other ends to a coupling piece slidable on the said stem between the upper ends of the said legs and the said head, table, or the equivalent. To collapse the legs of the tripod the coupling piece is slid on the stem towards the head, table, or the equivalent, thereby causing the said legs, through the tie-rods, to turn on their pivots until they and the said tie-rods are parallel, or approximately parallel, to the said stem, the lower ends of the said legs being then presented towards the said head, table, or its equivalent, and in order to erect the said tripod for use the said coupling piece has to be forced downwardly on the said stem which, through the said tie-rods, acts to turn the said legs in a reverse direction on their pivots until they are at the requisite angle to constitute a support after which the coupling piece is clamped, or otherwise secured, to the said stem so that the tie-rods then act to prevent relative movement of the said legs. Owing to the necessity of having to slide the coupling piece on the stem to effect the opening or closing of the legs of tripods of the aforesaid kind and also to the relatively large arc the lower ends of the said legs have to travel in passing from the closed to the open position or vice versa, the said tripods are not suitable for use in cases where great expedition in the erection of the tripod for use is essential, such, for example, as when required for use in supporting apparatus for projecting and firing rockets carrying life saving lines.

This invention has for its object to provide an improved tripod of the aforesaid kind which can be more easily and quickly erected and collapsed than has hitherto been possible.

According to this invention the tripod consists in, or comprises, legs pivotally connected at their upper parts to a head, table, or the equivalent and pivotally connected at their lower parts to interconnected tie rods which extend beyond the lower ends of the said legs when the tripod is collapsed and automatically spread outwardly when the tripod is placed in a vertical, or approximately vertical, position on the ground and in their movement spread, or open outwardly, the said legs into supporting position and thereafter act to prevent relative movement of the said legs whilst the tripod is in use.

We will particularly describe our invention with reference to the accompanying drawing which illustrates a preferred construction of tripod in accordance with this invention which is eminently suitable for use in supporting apparatus for projecting and firing rockets carrying life saving lines. In the said drawing Figures 1 and 2 are elevations showing the tripod collapsed and erected for use, respectively. Figure 3 is a section taken on the line $x\,x$ Figure 2.

In the tripoid illustrated the legs A are connected at their upper ends, by knuckle joints $a$, to a head B adapted to support a pistol C for projecting and firing a rocket carrying a life saving line. At, or towards the lower ends of the legs A are connected, by knuckle joints $d$, tie-rods D the free ends of which are connected, by knuckle joints $e$, to a coupling piece E. When the tripod is collapsed, as shown in Figure 1, the tie-rods D extend beyond the lower ends of the legs A and lie in alignment, or practically in alignment, therewith. To erect the tripod for use it is held by the operator in a vertical, or approximately vertical, position on the ground, and upon a slight outward pull on the legs A so as to move them out of alignment with their associate tie-rods D the said legs and tie-rods will automatically spread, or open, outwardly into the supporting position shown in Figure 2. The length of the interconnected tie-rods D limits the outward movement of the legs A and when the tripod is erected the said rods bear upon the ground and act to prevent both inward and outward movement of the said legs relatively the one to the other. When, however, the legs A are lifted off the ground they together with the tie-rods D automatically turn on their hinges into the collapsed position shown in Figure 1. The tie-rods D are preferably connected to the legs A at a short distance from the lower ends of the said legs and these ends may be pointed, or otherwise shaped, to enter the ground so as to prevent any liability of the tripod slipping when in use, or if desired, the said ends may be provided with means, such for example as castor wheel to facilitate movement of the tripod after it has been erected.

Tripods constructed as hereinbefore described are suitable for use for all purposes in which are at present used and are especially applicable for use where it is essential that they should be quickly and easily erected on any kind of ground which may for example be loose and uneven and therefore they are eminently suitable for use in supporting apparatus for projecting and firing rockets carrying life saving lines.

It is to be understood that the invention is not limited to the particular construction of tripod, or stand, hereinbefore described and shown, as modifications may be made without departing from the nature of the invention. For example, each of the legs of the tripod may consist of two, or more, telescopic members, so that by sliding one within the other, adjustment of the height of the head, or table, of the said tripod can be effected. In this case it is preferred to hinge two of the legs to a piece which in turn is hinged to the head, or table, of the tripod to allow for variation of the angle of said legs relatively to the tie-rods when the said tripod is erected. Again, in tripods more especially intended for use in supporting articles such as a camera, the head, or table, may be provided with a vertical socket within which a stem carrying a supplementary table can slide and be fixed in any desired position therein by means of a screw, or other suitable means.

What we claim is:—

1. A collapsible stand comprising a head, legs pivotally connected at their upper parts to said head, interconnected tie rods pivotally connected to said legs at a fixed point adjacent the lower ends of said legs, said tie rods extending beyond said legs when said stand is collapsed, whereby the stand may be set up by resting it upon said extending tie rods.

2. A collapsible stand comprising a head, legs pivotally connected thereto at their upper ends, tie rods pivotally connected to said legs at a fixed point adjacent the lower ends of said legs, said tie rods being interconnected to a central coupling piece which is adapted, when the stand is set up, to rest upon the surface over which the stand is erected.

In testimony whereof we have signed our names to this specification.

AUGUSTUS WILLIAM LOUIS SCHERMULY.
ALFRED JAMES SCHERMULY.
CHARLES SCHERMULY.